United States Patent [19]
Krumrey et al.

[11] 4,086,493
[45] Apr. 25, 1978

[54] X-RAY EXAMINATION APPARATUS

[75] Inventors: Guenter Krumrey, Weisendorf; Wilhelm Stöeckl, Fuerth-Sack, both of Germany

[73] Assignee: Siemens Aktiengesellschaft, Berlin & Munich, Germany

[21] Appl. No.: 776,264

[22] Filed: Mar. 10, 1977

[30] Foreign Application Priority Data

Mar. 26, 1976 Germany .......................... 2612987

[51] Int. Cl.² ............................................ G03B 41/16
[52] U.S. Cl. ............................................... 250/468
[58] Field of Search ................ 250/468, 469, 470, 471

[56] References Cited
U.S. PATENT DOCUMENTS 2,847,580 8/1958 Arvanetakis .......................... 250/469

*Primary Examiner*—Craig E. Church

*Attorney, Agent, or Firm*—Hill, Gross, Simpson, Van Santen, Steadman, Chiara & Simpson

[57] ABSTRACT

An X-ray examination apparatus having a magazine for unpacked and unexposed X-ray film material, a transport device for transporting the film from the magazine to an exposure station and back to a collector magazine, the transport device having a housing which is sealed with the various magazines so as to be impermeable to light characterized by a system for regulating the humidity of the air in the housing of the transport device and including a blower having a discharge connection with the housing. Preferably, the system for controlling the humidity is adjusted so that the relative humidity of the air in the transport device is adjusted to a desired value for the particular characteristics of the film being utilized in the apparatus and the blower is adjustable so that it maintains an over-pressure within the housing to prevent leakage of atmospheric air into the housing.

5 Claims, 1 Drawing Figure

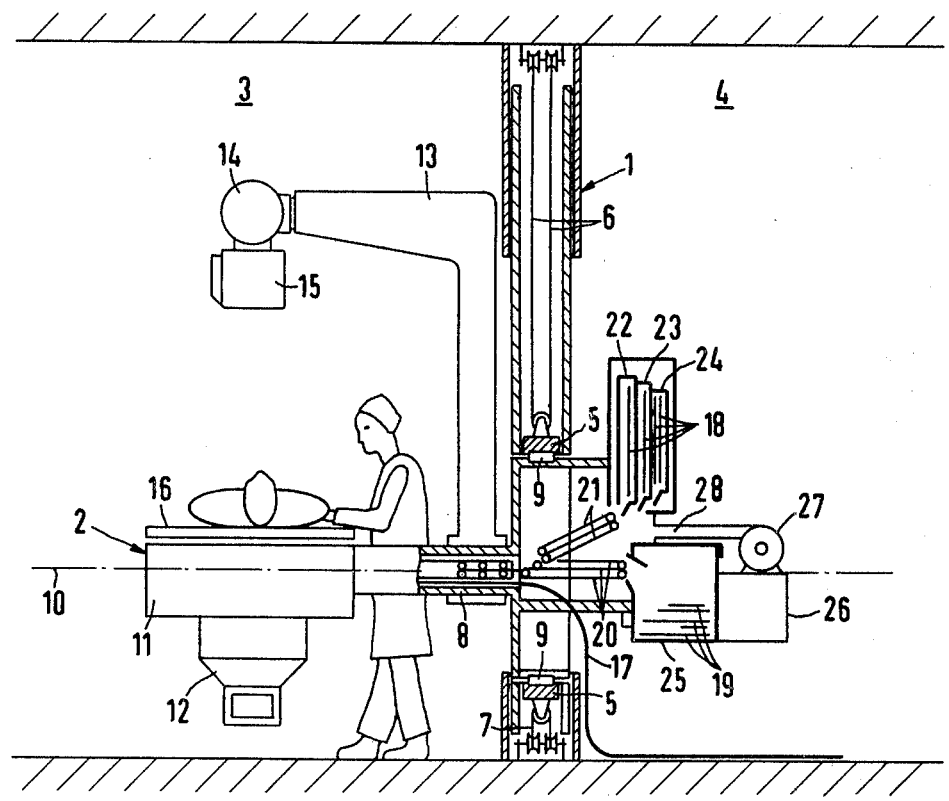

X-RAY EXAMINATION APPARATUS

BACKGROUND OF THE INVENTION

1. Field of the Invention

The present invention is directed to an X-ray examination apparatus which has a magazine for an unpaked and unexposed X-ray film material and means for transporting the film from the magazine to an exposure station and the means for transporting includes a housing which is sealed to the magazine so as to be impervious to light.

2. Prior Art

X-ray examination apparatuses, which have a magazine for either roll film or sheet film and means for transporting the film, which is free from a protective X-ray cassette, from the magazine to an exposure or photographic station and then to a storage magazine, are generally known. Examples of these X-ray examination apparatuses are disclosed in U.S. Pat. Nos. 3,415,988 and 3,553,453 as well as in German Offenlegungsschrift No. 2,031,386, which corresponds to United States patent application Ser. No. 147,736. In the X-ray examination apparatus of the above-mentioned type, the X-ray film material must be protected during its movement on the transport path not only from the incidents of light but also from electrostatic charges. The emulsion layer of the X-ray film has such a great electrical resistance, that it will become electrostatically charged during a rapid transport whether it is by sliding or rolling friction. The resulting electrostatic charges accummulate until they exceed the disruptive or dielectric strength of the film material. During the following electrical discharge, conversion or transformation changes in the emulsion layer will occur along the discharge channel or path. The usual discharge panel or path will have a dendroid configuration and is clearly visible after development of the film material which will exhibit dendriform exposure marks, which will have the configuration similar to streaks of lightening. These exposure marks, which are produced on the film at the discharge paths or channels, will be superimposed on the examination image and in some instances, interfer with the proper diagnosis of the X-ray image.

In order to rapidly break down the electrostatic charges or to restrict them to noncritical values, it has been previously proposed that the air within the region of the transport paths for the film material be ionized. However, the high voltage discharge paths, which are suitable as ion sources, also produce optical light, and they must therefore be installed so that they are either shielded from the film material which is transported passed the discharge paths or be provided with light traps. The provision of the shields or the light traps increases the cost of the apparatus.

SUMMARY OF THE INVENTION

The present invention is directed to providing another way of avoiding the accidental dendriform exposures of a film material from occurring during transport of the film in an X-ray examination apparatus which utilizes either a roll film or a sheet film magazine. In addition, the present invention provides a solution to the problem which has a uniform reliability in all operating situations.

To accomplish these tasks, the present invention is directed to an improvement in an X-ray examination apparatus having at least one magazine for unpacked and unexposed X-ray film material, means for transporting the film from the magazine to an exposure station, said means for transporting including a housing, and the magazine and housing for the means for transporting being sealed so as to be impervious to light. The improvement in the apparatus comprises means for regulating the humidity of the air in the means for transporting, said means for regulating including a blower having a connection to said housing.

The improvement to the apparatus is based on a solution which recognizes that the electric resistance of the emulsion layer of an X-ray film is very strongly dependent upon its water content. In addition, the emulsion layers are capable of rapidly giving off moisture to the surrounding air or rapidly absorbing moisture from the surrounding air. Thus, when the moisture content of the film is in a state of equilibrium, the electric conductivity of the film is dependent upon the humidity content of the surrounding air. In the case of a specific humidity value, the film's conductivity reaches values in which the electrical charge are compensated or balanced with sufficient rapidity so that no electrical voltage which reaches the disruptive or dielectric strength of the film material can result. By regulating the humidity of the air in the region of the transport path, it is possible at the same time to keep the remaining air humidity-dependent properties of the film material within specific limits. An example of such a property is the property of film sheets sticking together which lie on top of one another in the magazine. Thus, the control of the humidity in the means for transporting can therefore be directed to film properties of a less extensive range or spread.

In an expedient embodiment of the invention, the relative humidity of the air in the region of the transport path for the film material can be pre-adjusted to correspond to a value indicated for the film material which is used by the apparatus. The range of the desired value of the humidity is determined by the amount of humidity in the housing in which the emulsion layers possess the desired conductivity to greatly avoid or prevent the dendriform exposure of the film on the one hand and the humidity at which the emulsion layers will manifest so little adherence to one another that they will present no extreme difficulties during removal from a storage magazine in which the film sheets lie directly on top of one another. This range will vary from one film material to another film material. In addition, the material of the means for transporting such as the materual of the belts and rollers, will also be a factor. Thus, the optimum property can be obtained only by adapting the relative humidity of the air in the apparatus to the particular film material.

BRIEF DESCRIPTION OF THE DRAWING

The FIGURE is a cross-sectional view with portions in elevation for purposes of illustration of an X-ray examination apparatus in accordance with the present invention.

DESCRIPTION OF THE PREFERRED EMBODIMENT

The principles of the present invention are particularly useful in an X-ray examination apparatus generally indicated at 2. The apparatus 2 is supported in a wall 1, which separates an examination room 3 from an operating or equipment room 4. As illustrated, the apparatus 2 has a portion extending in each of the rooms 2 an 3.

The apparatus 2 includes a sliding carriage 5, which is received in the separating wall 1 and can be adjusted in height by means of a motor acting on cables 6 and 7. The sliding carriage 5 rotatably supports a carrier tube 8 by ball bearings 9 so that the tube may be rotated about a horizontal axis 10.

In the examination room 3, the apparatus 2 includes an X-ray photographic installation 11, which is mounted on the carrier tube 8 and includes an image intensifier television installation 12. In addition, an X-ray tube carrier 13 is mounted on the carrier tube 8 and supports an X-ray tube 14, which is provided with a depth diaphragm 15. A patient bearing or supporting location 16 is supported on the housing of the X-ray photographic installation 11 in such a manner as to be movable in both a longitudinal and a transverse direction. The electric current supply line for both the X-ray tube 14 as well as a supply line 17 for the image intensifier television installation 12 of the photographic installation 11 are received within the carrier tube 8. Thus, the X-ray tube 14, installation 11 and 12 can be rotated around the horizontal axis 10.

In addition, the inside or inner width of the carrier tube 8 has a dimension of the largest size of the X-ray film sheet such as 18, which are to be used in the apparatus, and the carrier tube 8 forms a housing for a means for transporting the film from magazines in the room 4 to the exposure station of the installation 11. As illustrated, the transport means includes transport paths 20 and 21 which have continuous belts which will transport the unexposed X-ray film 18 from the equipment or operating room 4 to the photographic installation 11, and subsequently transports the exposed film 19 back to the equipment or operating room. In the operating or control room 4, the apparatus 2 has film storage magazines 22, 23 and 24. Each magazine 22, 23 and 24 holds unpacked and unexposed film 18 of a given size or format so that three different sizes of film are available and a sheet removing device (not illustrated) will remove the selected size of the unexposed film sheets from one of the three magazines 22, 23 and 24. In addition, a collector magazine 25 is arranged adjacent to the transport path to receive the exposed film sheet 19 as they are returned from the exposure station.

In accordance with the present invention, means for controlling the relative humidity in the air within the housing of the transport means comprises a system 26 which is mounted on the collector magazine 25. The system 26 includes a blower 27 having a connection 28 to the interior of the housing of the means for transporting. The system 26 will permit the control of the relative humidity of the air within the housing of the transporting means within pre-adjusted desired limits. The connecting location 28 is disposed in such a manner that it discharges into the housing in a direction of movement of the transport at a point spaced from the outlets of the magazines 22, 23 and 24 for the unexposed film as well as behind the inlet opening for the magazine 25 for exposed film 19. Thus, the openings for the magazines 22, 23 and 24 as well as the opening for the collector magazine 25 are positioned between the outlet connection 28 and the exposure station which is within the photographic installation 11. The output or capacity of the blower 27 as well as the efficiency of the system 26 for regulating the humidity of the air are designed in such a manner that they may be adjusted to maintain a minimal over-pressure or positive pressure within the housing of the film transporting means in spite of any leakage from the housing.

The system 26 for regulating the relative humidity of the air produces a constant climate which may be pre-adjusted to provide a desired relative humidity for the air in the interior of the X-ray examination apparatus 2, the housing of the transport means as well as the magazine 22, 23, 24 and 25, and the value of the relative humidity is independent of the climate conditions prevailing outside the X-ray examination apparatus 2. As a consequence of the output or capacity of the blower 27, which capacity maintains a positive pressure in the interior of the apparatus 2, it is possible to prevent air from either the examination room 3 or operating room 4, which air may be too humid or too dry, from penetrating into the apparatus and locally producing different values for the humidity. Due to the connection of the receptacles for the film storage magazines and the film collector magazines to the housing of the means for transporting, the same relative humidity for the air will be maintained in these magazines. By maintaining the humidity of the air above a minimum amount, the electric conductivity of the emulsion layer will be maintained at a value at which no critical electrostatic charges can accummulate. In addition, it is possible to prevent the film sheets from sticking to one another due to an excessively high humidity in the air, which high humidity will occasionally occur in tropical countries and will obstruct the removal of individual film sheets from their particular storage magazines.

An additional advantage of the present improvement over the proposed use of ionized air is that the desired range of relative humidity of the air can still be maintained for hours even if a power failure occurs. However, ionized air only has a half value period, which lies in the order of magnitude of approximately 1 second.

Good experiences were made by using an X-ray film sold under the trade designation Curxi RP1 by the AG-FA-Company in West Germany which film is conveyed on belts or rollers made of Polyurethan 38280 of the Boettcher Company in West-Germany, at a desired range for relative humidity within the housing of the means for transport of 40 to 60% relative humidity. By changing the range of relative humidity good experiences will be made too with films of other manufactureers.

The system 26 has to suck air from within the housing of the means for transport or the magazines to sense the relative humidity of the air within the housing and the magazines and add air of a given humidity that will adjust the relative humidity of the air within the housing to the desired value. Such systems are sold in different sized by the Weiss Company in Giessen, West-Germany.

Although various minor modifications may be suggested by those versed in the art, it should be understood that we wish to employ within the scope of the patent warranted hereon, all such modifications as reasonably and properly come within the scope of our contribution to the art.

We claim:

1. In an X-ray examination apparatus having at least one magazine for unpacked and unexposed X-ray film material, means for transporting the film from the magazine to an exposure station, said means for transporting including a housing, said magazine and the housing for the means for transporting being sealed so as to be impervious to light, the improvement comprising means for regulating the humidity of the air in the means for transporting, said means including a blower having a connection to said housing.

2. In an X-ray examination apparatus according to claim 1, wherein said means for regulating being adjustable so that the relative humidity in the housing of the means for transporting is pre-adjusted to a desired value according to the characteristics of the film material being utilized in the apparatus.

3. In an X-ray examination apparatus according to claim 1, wherein the connection of the blower is located on the housing behind the magazine for the unexposed X-ray film material.

4. In an X-ray examination apparatus according to claim 1, which includes a collector magazine for exposed film material, said collector magazine being disposed adjacent the magazines for unexposed film material and receiving the exposed film transported by the transporting means from the exposed station to the collector magazine, wherein the connection of the blower is provided on the housing at a position so that the inlet to the collector magazine and the magazine for unexposed film are disposed between the exposure station and the point of the connection.

5. In an X-ray examination apparatus according to claim 1, wherein the blower has an adjustable output capacity so that a positive pressure may be maintained in the housing of the means for transporting the film material regardless of leakage therefrom.

* * * * *